United States Patent
Irie et al.

(10) Patent No.: US 7,434,030 B2
(45) Date of Patent: Oct. 7, 2008

(54) PROCESSOR SYSTEM HAVING ACCELERATOR OF JAVA-TYPE OF PROGRAMMING LANGUAGE

(75) Inventors: Naohiko Irie, Kokubunji (JP); Fumio Arakawa, Kodaira (JP)

(73) Assignee: Renesas Technology Corp., Tokyo (JP)

( * ) Notice: Subject to any disclaimer, the term of this patent is extended or adjusted under 35 U.S.C. 154(b) by 882 days.

(21) Appl. No.: 10/488,537

(22) PCT Filed: Sep. 12, 2001

(86) PCT No.: PCT/JP01/07909

§ 371 (c)(1),
(2), (4) Date: Mar. 4, 2004

(87) PCT Pub. No.: WO03/025743

PCT Pub. Date: Mar. 27, 2003

(65) Prior Publication Data

US 2004/0236927 A1    Nov. 25, 2004

(51) Int. Cl.
*G06F 9/30* (2006.01)
(52) U.S. Cl. .................. 712/209; 717/118; 717/136; 717/139
(58) Field of Classification Search .......... 718/1; 712/36, 1, 202, 204, 205, 209, 210–214, 712/220; 717/108, 114, 116, 118, 136, 139, 717/165
See application file for complete search history.

(56) References Cited

U.S. PATENT DOCUMENTS

| | | | | |
|---|---|---|---|---|
| 6,826,749 B2 * | 11/2004 | Patel et al. | .................. | 717/148 |
| 6,907,515 B2 * | 6/2005 | Seal et al. | .................. | 712/209 |
| 6,965,984 B2 * | 11/2005 | Seal et al. | .................. | 712/209 |
| 7,089,539 B2 * | 8/2006 | Dornan et al. | .................. | 717/139 |
| 7,162,611 B2 * | 1/2007 | Rose et al. | .................. | 712/209 |
| 2002/0019976 A1 * | 2/2002 | Patel et al. | .................. | 717/137 |
| 2002/0188825 A1 * | 12/2002 | Seal et al. | .................. | 712/209 |

(Continued)

FOREIGN PATENT DOCUMENTS

WO    WO 00/34844    12/1999

OTHER PUBLICATIONS

International Search Report dated Nov. 13, 2001.

(Continued)

*Primary Examiner*—Van H Nguyen
(74) *Attorney, Agent, or Firm*—Reed Smith LLP; Stanley P. Fisher, Esq.; Juan Carlos A. Marquez, Esq.

(57) ABSTRACT

In a processor system comprising of a processor having an instruction decoder 22, a general register 61 composed of a plurality of register areas and at least one ALU 60, and a Java accelerator 30 for converting a Java bytecode sequence to a native instruction sequence for the processor and supplying the native instruction sequence to the instruction decoder. The Java accelerator 30 is composed of a bytecode translator 40 for converting the Java bytecode sequence to the native instruction sequence for the processor and a register status control unit 50 for mapping a Java operand stack to any of the register areas of the general register and detecting a bytecode redundant for the processor. When a redundant bytecode is detected by the register status control unit 50, the supply of the native instruction from the bytecode translator 40 to the instruction decoder 22 is inhibited.

11 Claims, 6 Drawing Sheets

U.S. PATENT DOCUMENTS

| | | | |
|---|---|---|---|
| 2002/0188826 A1* | 12/2002 | Rose et al. | 712/209 |
| 2002/0199087 A1* | 12/2002 | Seal et al. | 712/227 |
| 2004/0015896 A1* | 1/2004 | Dornan et al. | 717/139 |
| 2005/0149694 A1* | 7/2005 | Patel | 712/36 |
| 2007/0118724 A1* | 5/2007 | Patel | 712/202 |

OTHER PUBLICATIONS

Markus Levy, "Java to Go: Part 1—Accelerators Process Byte Codes for Portable and Embedded Applications", Microdesign Resources, Feb. 12, 2001, pp. 1-4.

* cited by examiner

FIG.4A

| | | |
|---|---|---|
| iload_1 | ; load a | ······ (1) |
| iload_2 | ; load b | ······ (2) |
| iadd | ; add a and b | ······ (3) |
| istore_3 | ; store to c | ······ (4) |

FIG.4B (1) MOV.L @(1,fp), R9
(2) MOV.L @(2,fp), R10
(3) ADD R9, R10
(4) MOV.L R10, @(3,fp)

FIG.4C

| | | | |
|---|---|---|---|
| A: | iinc 3 -1 | ; i -- | ······ (1) |
| | iload_3 | ; load i | ······ (2) |
| | ifit B | ; if<0, exit loop | ······ (3) |
| | iload_2 | ; load sum | ······ (4) |
| | aload_1 | ; load array pointer | ······ (5) |
| | iload_3 | ; load array index | ······ (6) |
| | iaload | ; load data of array | ······ (7) |
| | iadd | ; add to sum | ······ (8) |
| | istore_2 | ; store sum | ······ (9) |
| | goto A | ; goto loop head | ······ (10) |

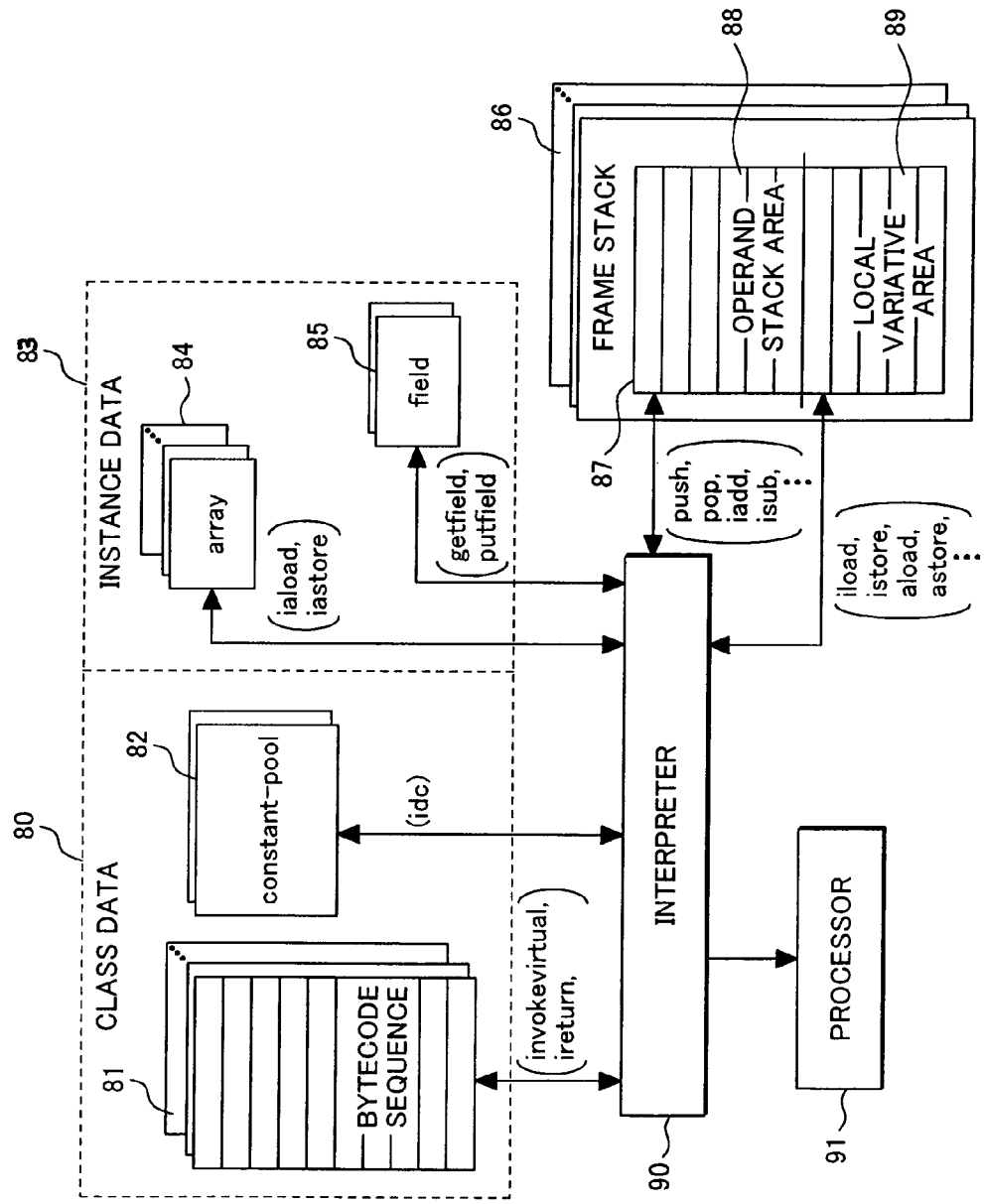

US 7,434,030 B2

PROCESSOR SYSTEM HAVING ACCELERATOR OF JAVA-TYPE OF PROGRAMMING LANGUAGE

TECHNICAL FIELD

The present invention relates to processor systems and, more particularly, to a processor system comprising a Java™ accelerator.

BACKGROUND ART

In recent years, Java has begun to be used widely as application software in the embedded use of a microprocessor. This is because of excellent program transportability which allows a Java program to run on a machine provided with the JVM (Java Virtual Machine) implemented thereon in the form of hardware or software, irrespective of the type of a processor or the configuration of a system. A Java program has the advantage that an object code is small in size since the program is based on stack operations and a program instruction, which is termed "bytecode" in Java, does not need an operand field. The Java program also has the advantage of being excellent in security since the concept on data formats is strict and the verification of a bytecode is performed before the execution of the program.

Most of embedded systems using Java implement a JVM function by using software. This is because a Java program can be executed on the same processor as software other than Java, e.g., a multimedia application program such as OS or MPEG4. In the case where a Java program is executed under a JVM environment implemented by using software, however, a problem is encountered that the program execution speed is extremely slow compared with the case of executing a program in which the same contents of processing are described in native instructions of a processor. If a comparison is made between the case where, e.g., a Dhrystone benchmark program is described in the C language, compiled, and executed and the case where the program is described in Java and executed on the JVM, a several tens of times performance difference is present therebetween. The following is the two major factors causing the performance difference:

(1) Since Java instructions (bytecodes) are executed by an interpreter on the JVM, an interpreter overhead occurs.

(2) Since a Java execution model assumes arithmetic operations on a stack, frequent memory accesses are necessarily entailed when a Java program is executed on an ordinary register-based processor so that an ALU needs extra execution cycles.

As conventional technologies for executing a Java program at a high speed, the JIT (Just In Complier) composed of software and an accelerator composed of hardware are known. However, most of embedded uses with limited memory capacity tend to adopt a hardware accelerator since the JIT requires a large memory capacity.

As hardware accelerators, various models including a dedicated processor type and a type having an accelerator function embedded in a part of an existing processor have been proposed. Examples of the accelerator of the latter type include the Jazelle available from ARM Limited and the JSTAR available from Nazomi communications, Inc.

For example, in a document "Java to Go: Part 1, Microprocessor Report, Feb. 12, 2001" and in "Java Virtual Machine Hardware for RISC and CISC Processors" disclosed in International Publication No. WO 00/34844 (PCT/US99/28782), a program execution speed is increased by converting bytecodes read out from an instruction cache to native instructions of a processor by using a hardware translator and thereby reducing the interpreter overhead, which is the factor (1).

As schematically shown in, e.g., FIG. 6, the JVM includes, as areas referenced by an interpreter 90, a class data area 80 in which bytecode sequences 81 and constant pools 82 are defined, an instance data area 83 in which array objects 84 and fields 85 such as instance variables are defined, and frame stacks 86. Each of the frame stacks 86 is composed of a plurality of frames 87 each consisting of an operand stack 88 and a local variable area 89. Variables used for arithmetic operations on the JVM are basically defined in the local variable areas 89 in the individual frame stacks 86. The interpreter 90 of the JVM successively reads out bytecodes from the bytecode sequence 81 and converts a Java instruction shown by each of the bytecodes to a native instruction format of the processor 91. In FIG. 6, representative examples of Java instructions are shown inside the parentheses in correspondence with the individual areas described above.

In a Java program, the operation of loading those of the variables defined in the local variable area 89 which are necessary for the arithmetic operation on the stack top of the operand stack 88 is performed prior to each arithmetic operation. This operation is performed by a load instruction (e.g., "iload") specified by a bytecode. After an operand necessary for the arithmetic operation is stacked on the operand stack 88, an arithmetic instruction specifying the stack top mentioned above as an implicit operand is issued. By the arithmetic instruction, an arithmetic operation using the contents of the stack top as an operand is executed and the result of the arithmetic operation is stored temporarily on the stack top of the operand stack 88. The result of the arithmetic operation should finally be stored in the local variable area 89 in the frame stack and the storing of the result of the arithmetic operation is implemented by a store instruction (e.g., "istore") indicated by the next bytecode.

Thus, under a JVM execution environment, the operation of moving local variables onto the stack top and moving the result of the arithmetic operation from the stack top to the local variable area occurs on each arithmetic operation. Accordingly, in the case where a Java program is executed on an ordinary processor using a general register as an operand area, frequent accesses to the general register occur.

In International Publication No. WO 00/34844 (PCT/US99/28782) mentioned above, for example, the R0 to R5 of general registers are mapped to the higher-order six regions of the operand stack and the R6 and R7 thereof are mapped for local variables. In the document "Java to Go: Part 1, Microprocessor Report, Feb. 12, 2001", on the other hand, the R0 to R3 of general registers are mapped to the higher-order four regions of the operand stack and a 0-th local variable is mapped to the R4 thereof, as stated in page 3.

Thus, in these prior-art technologies, the mapping of both of the operand stack and the local variables to the general registers is fixed so that the use of the general registers is lacking in flexibility and the use efficiency of the general registers are lowered thereby. In addition, these prior-art technologies faithfully execute all the Java instructions specified by the bytecode sequence by using register-based processors and no consideration has been given to the avoidance of extra execution cycles pointed out as the factor (2) causing the delayed execution of a Java program.

It is therefore an object of the present invention to provide a processor system which executes a Java program at a higher speed by omitting redundant instruction execution cycles.

Another object of the present invention is to provide a processor system provided with a Java accelerator capable of flexibly controlling the mapping of an operand stack and local variables to a general register.

DISCLOSURE OF THE INVENTION

To attain the objects of the present invention, a processor system according to the present invention is comprised of: a processor having an instruction decoder, a general register composed of a plurality of register areas, and at least one arithmetic logical unit (ALU); and a Java acrelerator for converting a Java bytecode sequence to a native instruction sequence for the processor and supplying the native instruction sequence to the instruction decoder, wherein the Java acrelerator is provided with means for detecting a bytecode redundant for the processor, whereby the supply of a native instruction to the instruction decoder is inhibited when the redundant bytecode is detected by the detecting means.

More specifically, the Java acrelerator is comprised of a bytecode translator for converting the Java bytecode sequence to the native instruction sequence for the processor and a register status control unit for mapping a Java operand stack to any of the register areas of the general register in accordance with the Java bytecode being processed in the bytecode translator, and the register status control unit judges, while a bytecode indicative of an instruction to load a local variable on the operand stack is processed in the bytecode translator, whether the bytecode is redundant or not and issues an output inhibit signal of the native instruction to the bytecode translator when the bytecode is detected as a redundant bytecode.

One characteristic aspect of the present invention resides in that the register status control unit is provided with means for storing a use status of each of the register areas of the general register and dynamically maps the Java operand stack to any of the register areas of the general register in accordance with the use status of the general register.

In an embodiment of the present invention, the register status control unit has register contents management means for storing a correspondence relation between each of the register areas of the general register and a variable being set to the register area and judges, when a bytecode indicative of an instruction to load a variable on the operand stack is processed in the bytecode translator, whether the bytecode is redundant or not by comparing the variable treated in the variable load instruction with a variable stored in the register content management means.

BRIEF DESCRIPTION OF THE DRAWINGS

FIGS. 4(A) to 4(C) are views individually showing a Java bytecode sequence, a bytecode sequence resulting from conversion in the bytecode translator 40, and another example of the Java bytecode sequence;

FIG. 6 is a view for explaining the features of the JVM.

BEST MODE FOR CARRYING OUT THE INVENTION

Figure 1:
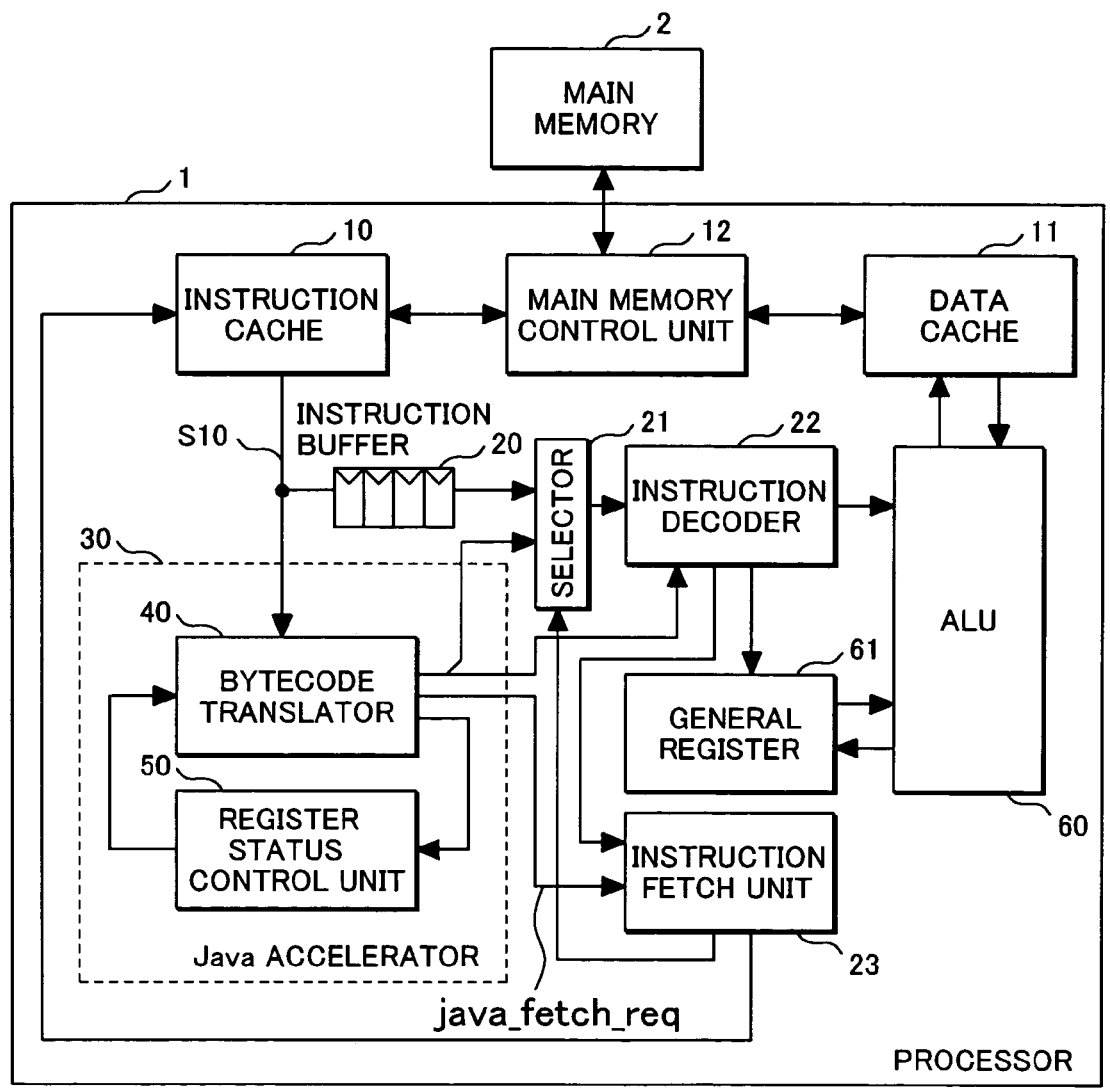
FIG. 1 is a block diagram showing a schematic structure of a processor provided with a Java accelerator 30 according to the present invention.

Referring to the drawings, the embodiments of a processor system according to the present invention will be described herein below.

FIG. 1 shows a schematic structure of a processor provided with a Java accelerator 30 according to the present invention.

A processor 1 is connected to a main memory 2. In the main memory 2, the JVM, bytecode sequences, frame stacks, and the like are held for executing a Java program in addition to a normal program described in a native instruction format peculiar to the processor 1 and data. The processor 1 has an instruction cache 10 for holding part of the program (native instruction sequences for the processor 1 or Java bytecode sequences) stored in the main memory 2, a data cache 11 for holding part of the data or frame stacks stored in the main memory 2, and a main memory control unit 12 connected to the main memory 2. The main memory control unit 12 controls data transfer between the main memory 2 and each of the instruction cache 10 and the data cache 11.

Similarly to an ordinary processor, the processor 1 comprises an instruction buffer 20, an instruction decoder 22, a general register 61, an arithmetic and logic unit (ALU) 60, and an instruction fetch unit 23. Although the ALU 60 is shown here with one block for the sake of convenience, the ALU 60 may be composed of a plurality of arithmetic logical units. The instruction decoder 22 decodes only native instructions of this processor such as an instruction set for the control microcomputer SH3 provided by Hitachi, Ltd. An instruction code sequence peculiar to the processor or a Java bytecode sequence temporarily held in the instruction cache 10 is read out to a signal line (internal bus) S10 in response to a control signal from the instruction fetch unit 23 and inputted to the instruction buffer 20 and to the Java accelerator 30.

The Java accelerator 30 is composed of a bytecode translator 40 for converting a Java bytecode sequence to a native instruction sequence for the processor 1, and a register status control unit 50 for managing the status of the general register 61.

While a program peculiar to the processor 1 is being executed, an output from the instruction buffer 20 is validated so that the output from the instruction buffer 20 is inputted to the instruction decoder 22 via a selector 21. While a Java program is being executed, on the other hand, an output from the bytecode translator 40 is validated and a Java bytecode sequence read out from the instruction cache 10 is converted to a native instruction sequence for the processor 1 by the bytecode translator 40 and then inputted to the instruction decoder 22 via the selector 21.

Figure 2:
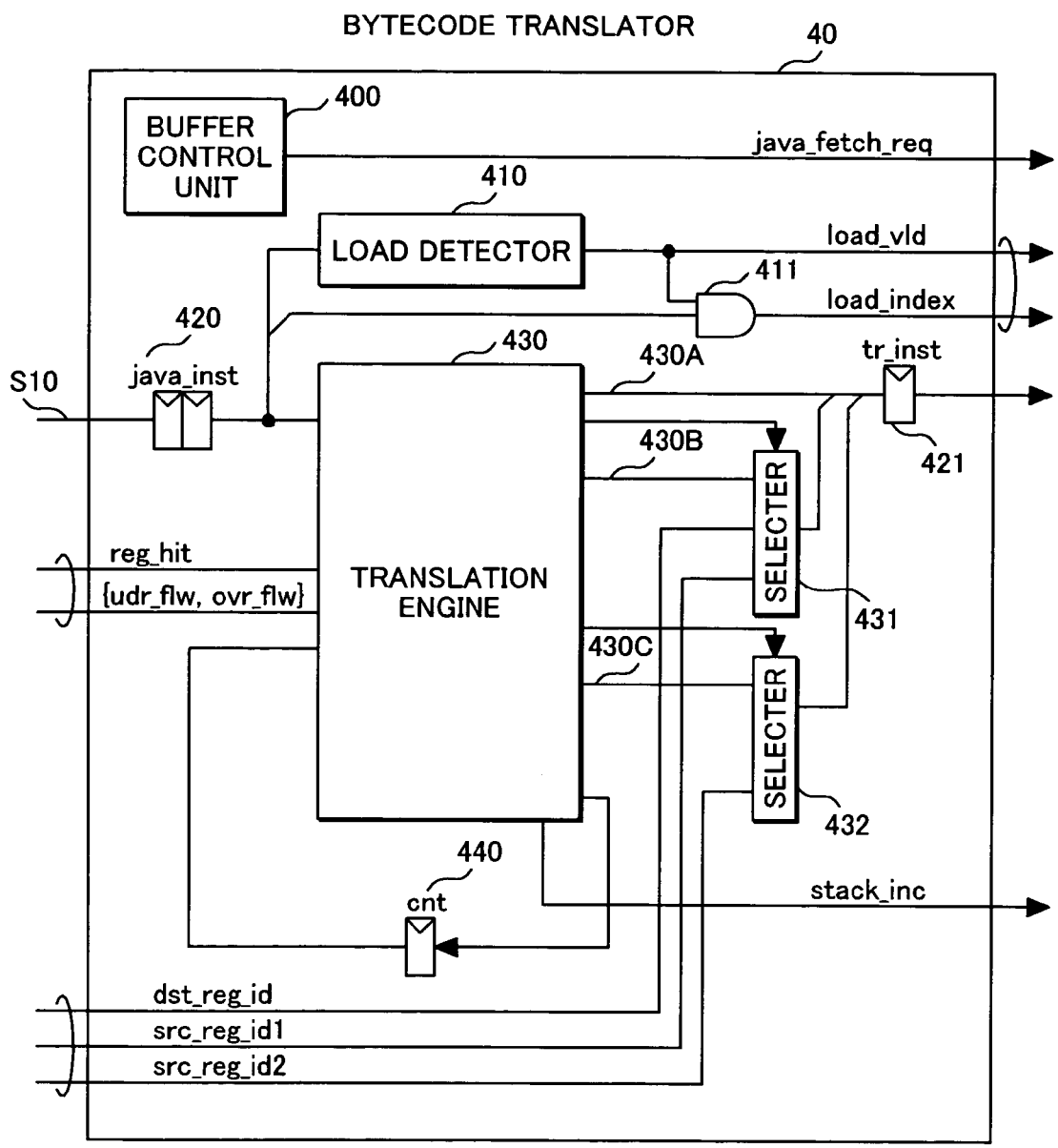
FIG. 2 is a block diagram showing an embodiment of a bytecode translator 40 composing the Java accelerator 30 shown in FIG. 1.

FIG. 2 shows an example of the bytecode translator 40. The bytecode translator 40 is comprised of a buffer java_inst 420 for temporarily holding the bytecode sequence read out from the instruction cache 10, a translation engine 430 for converting the bytecode read out from the java_inst 420 to a native instruction code for the processor 1, a buffer management unit 400 for controlling the reading in of a bytecode sequence to the java_inst 420, a load detector unit 410 for detecting whether an input bytecode is a variable load instruction ("iload", "aload", or the like) to load a variable from the local variable area to the operand stack, and a gate 411 for outputting an index indicated by the input bytecode when the input bytecode is a load instruction to load a local variable on the operand stack.

The translation engine 430 is implemented by mapping the JVM interpreter function of software description to hardware (LSI) and formed in accordance with a method of, e.g., converting the interpreter portion of software description to hardware description language such as Verilog and performing logic synthesis. When an input bytecode is converted to native instruction code by the translation engine 430, there are cases where one bytecode is divided into a plurality of native instruction codes depending on the type of the bytecode. A counter cnt 440 is for counting the number of native instructions having been converted so far or the number of cycles when one bytecode is divided as above into a plurality of native instruction codes.

Of the native instructions generated by the translation engine 430, the operation code portion is inputted to the output buffer tr_inst 421 via a signal line 430A. Of the operand portion, a first operand is outputted to a signal line 430B and a second operand is outputted to 430C. These operands are inputted to the output buffer tr_inst 421 via selectors 431 and 432, respectively. Although the present embodiment assumes that the instruction architecture of the processor 1 is of a two-operand type as adopted in the SH processor available from Hitachi, Ltd., the number of output signal lines and selectors for operands may be increased to 3 in the case of a three-operand instruction type adopted in a ordinary processor such as a Microprocessor without Interlocked Pipeline Stages (MIPS) or Acom RISC Machines (ARM).

The reason for the provision of the selectors 431 and 432 is that there is a case in the present invention where an output value from the register status control unit 50, which will be described later, is used as an output operand from the bytecode translator 40 instead of output operands from the translation engine 430. The operation of the register status control unit 50 is controlled by an output signal load_vld from the load detector unit 410 which is brought into an ON state when an input bytecode is a load instruction ("iload" or the like) to load a local variable on an operand stack and by an output signal load_index from the gate 411.

Figure 3:
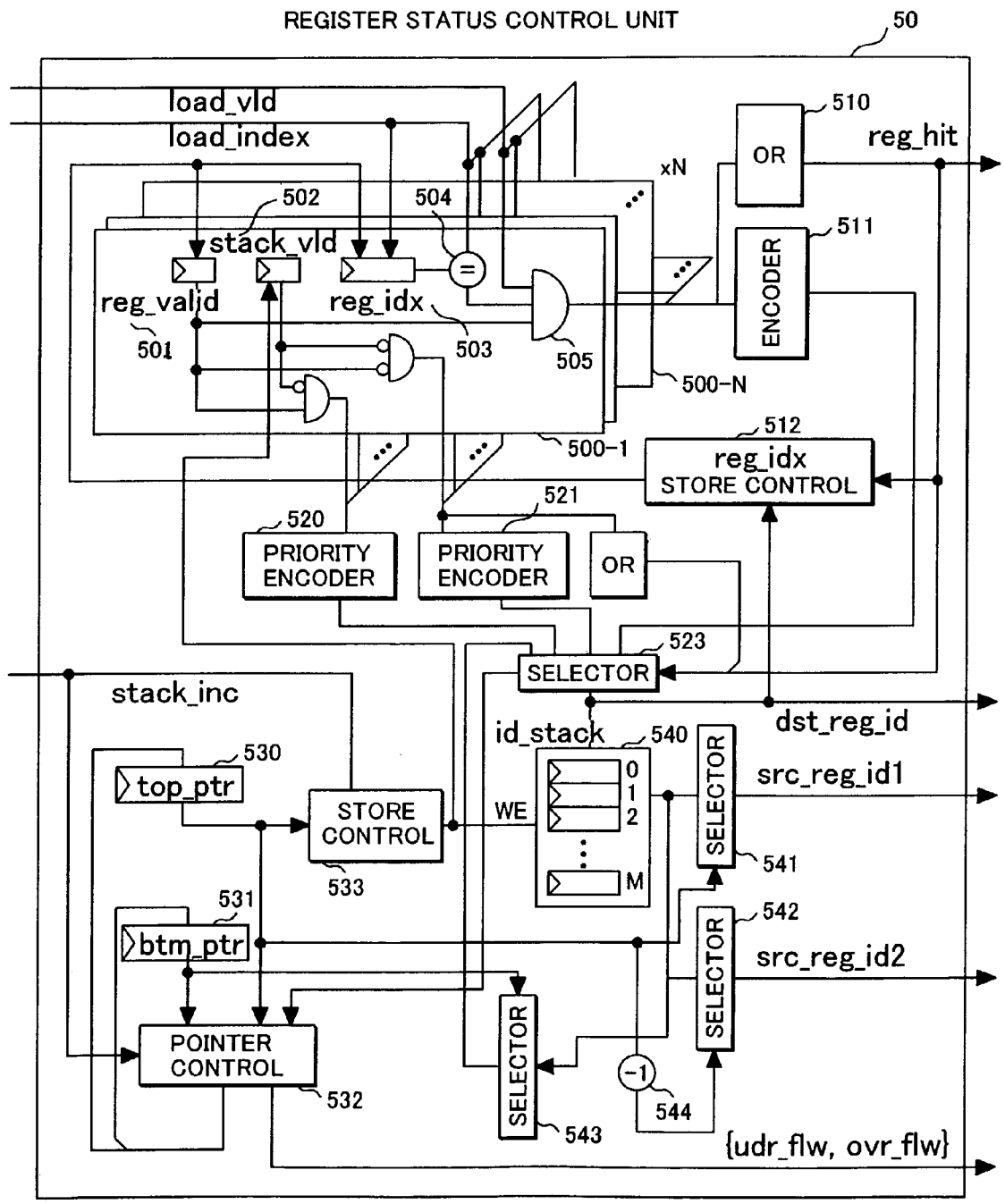
FIG. 3 is a block diagram showing an embodiment of a register status control unit 50 composing the Java accelerator 30 shown in FIG. 1.

FIG. 3 shows an embodiment of the register status control unit 50.

The register status control unit 50 comprises a plurality of register contents management logics 500-$i$ (i=1 to N) provided to correspond to individual entries to the general register 61, and a stack management register id_stack 540 for managing the mapping of the JVM operand stack 88 shown in FIG. 6 to the general register 61.

Each of the register content management logics 500-$i$ includes a validity indication memory reg_valid 501 for indicating whether the corresponding one of the entries of the general register holds data valid in a Java execution environment, an operand stack indication memory stack_vld 502 for indicating whether the corresponding entry of the general register is being used as an the operand stack in the JVM, and an index memory reg_idx 503 for storing the index value of a local variable having been set to the corresponding entry of the general register.

According to a definition in the JVM, an arbitrary local variable is specified only by a pointer indicative of a current frame 87 in the frame stack 86 and by an index indicative of a relative position from the pointer, and it is inhibited an arbitrary variable from being referred to according to an address pointer, for example, as in the C language. Accordingly, an arbitrary local variable set to the local variable area 89 can be specified only with the index value if the current frame is assumed to be fixed. The use of this characteristic allows, for each of the local variables, the management of the entry number (register number) in the general register 61 in which the local variable is loaded and the index value in a one-by-one correspondence.

The stack management register id_stack 540 is composed of entries as many as or fewer than the entries of the general register 61. The locations of the entries in the id_stack 540 are managed in a ring-buffer manner by a top pointer top_ptr 530 and a bottom pointer btm_ptr 531. Each of the entries holds the register number of the general register 61. However, the id_stack 540 is satisfactory if it can conceptually implement a stack structure and is not limited to the ring-buffer structure mentioned above. Although the register status control unit 50 comprises various circuit elements such as an encoder and selectors in addition to the register content management logics 500-$i$ (i=1 to N) and the stack management register id_stack 540, the functions of these circuit elements will be elucidated later in the detailed description of the operation.

A description will be given here to a relationship between a Java bytecode sequence to be inputted to the Java accelerator 30 of the present invention and a native instruction code sequence for the processor 1 outputted from the Java accelerator 30 with reference to FIG. 4.

FIG. 4(A) shows an example of a Java bytecode sequence and FIG. 4(B) shows a native instruction code sequence obtained by converting the bytecode sequence. Here, "iload_1" (1) and "iload_2" (2) are bytecodes (instructions) instructing to load respective data sets (variables "a" and "b") residing in the first and second entries of the local variable area 89 in succession on the operand stack 88 shown in FIG. 6. On the other hand, "iadd" (3) is an instruction instructing to add the higher-order two data sets "a" and "b" loaded on the operand stack by the iload instructions (1) and (2) and to load the addition result "c" on the top of the operand stack 88, and "istore_3" (4) is an instruction instructing to store a data set "c" on the top of the operand stack into the third entry of the local variable area 89.

In the case of converting these bytecodes to native instructions of-the processor 1, it is necessary to use part of the general register 61 as the operand stack 88 since the architecture of the processor 1 as the target is register-based. In an example shown in FIG. 4(B), the ninth register area R9 and the tenth register area R10 of the general register 61 are used as the operand stack.

The bytecodes (1) to (4) shown in FIG. 4A are transferred from the main memory 2 to the instruction cache 10 and supplied successively from the instruction cache 10 to the bytecode translator 40 of the Java accelerator 30. In the bytecode translator 40, the first bytecode "iload_1", e.g., is converted to the first native instruction "MOV.L @ (1, fp), R9" shown in FIG. 4B by using an instruction conversion mechanism implemented on the translation engine 430.

Here, MOV.L indicates the transfer of data having a 4-byte width, fp indicates a frame pointer, and R9 indicates the ninth register area of the general register 61. Although the frame pointer fp is actually a value stored in the specified area of the general register 61, the present description uses the mnemonic fp to represent the frame pointer for easy understanding. The native instruction "MOV.L @ (1, fp), R9" indicates that the contents (local variable) of the data cache at an address location shown by "frame pointer+(1×4)" is loaded on the ninth register area R9 of the general register 61.

The native instruction resulting from the conversion by the translation engine 430 is temporarily stored in the output buffer tr_inst 421 and then fetched by the instruction decoder 22 via the selector 21. The native instruction fetched by the instruction decoder 22 is executed by the same process as during the execution of an ordinary instruction in the processor 1. That is, data specified by the instruction is read out from the general register 61 and sent to the ALU 60. In the case where the native instruction is "MOV.L @ (1, fp), R9", the value of the frame pointer fp and an immediate 1 are sent to the ALU 60 whereby the address value of "frame pointer+(1× 4)" is calculated by the ALU 60 and the contents at the address location is read out from the data cache 11 into the ALU 60 and stored in the ninth register area: R9 of the general register 61. The bytecode sequences stored in the instruction cache 10 are supplied in a pipelined manner to the bytecode translator 40 of the Java accelerator 30, converted individually to corresponding native instructions, and then executed.

The bytecode sequence shown in FIG. 4(A) shows an example of a simplest addition routine. As a more complicated bytecode sequence, an execution of a routine for calculating the total sum of an array of data sets will be explained next. FIG. 4(C) shows an example of the bytecode sequence for such a total-sum calculation routine. What is to be noted here is that, since Java is a stack machine, an "iload" (or "aload") instruction for loading necessary data on the operand stack 88 from the local variable area 89 is executed for each arithmetic operation.

Although the bytecode ("iload" or "aload") underlined in FIG. 4(C) is executed every time a loop is repeated, the same value is loaded on the operand stack each time from the local variable area. Accordingly, if these bytecodes are converted to native instructions and supplied to the instruction decoder 22, there occurs such a useless operation that the ALU 60 repeatedly executes a redundant load instruction for data with an unchanged value or data (the result of an arithmetic operation) already stored in the general register.

The present invention is characterized in that such a redundant load instruction is detected in the register status control unit 50 and the Java program execution speed is increased by preventing the native instruction which is insignificant even though it is executed from being supplied from the bytecode translator 40 to the instruction decoder 22. In the case of the bytecode sequence shown in, e.g., FIG. 4(C), by applying the present invention, it is achieved a reduction in the number of native instructions executed in each of the second and subsequent iterations from conventional 10 to 6. As the number of times the loop is repeated is increased, the effect of reducing the time required for arithmetic operations is more remarkable.

A detailed description will be given herein below to the function and operation of the Java accelerator 30 according to the present invention with reference to FIGS. 1 to 3.

Each of the Java bytecodes supplied from the instruction cache 10 to the bytecode translator 40 is stored temporarily in the buffer java_inst 420, fetched by the translation engine 430, and converted to a native instruction corresponding to the bytecode. Of the native instruction generated by the translation engine 430, the opcode portion is inputted to the output buffer tr_inst 421 via the signal line 430A. As for the operand portions outputted to the signal lines 430B and 430C, if the operand portion is already present in the general register and readable from the general register, the register numbers outputted from the register status control unit 50, i.e., "dst_reg_id", "src_reg_id1", and "src_reg_id2" are selected by the selectors 431 and 432 in place of the output operands from the translation engine 430 and inputted to the output buffer tr_inst 421. In the case where the operand is implicitly specified by the input bytecode or explicitly specified by, e.g., the byte next to the input bytecode, the operands generated in the translation engine 430 are selected and inputted to the output buffer tr_inst 421.

For example, if an iadd instruction (3) in the bytecode sequence shown in FIG. 4(A) is inputted to the translation engine 430, the native instruction ADD generated by the translation engine is inputted as the opcode portion to the output buffer tr_inst 421, while the register numbers R9 and R10 outputted from the register status control unit 50 are inputted as first and second operands to the output buffer. A method for generating register numbers in the register status control unit 50 will be described later.

If a plurality of native instructions should be generated from a certain bytecode corresponding thereto, the conversion process of the bytecode requires a plurality of cycles. In this case, the translation engine 430 determines native instructions to be generated in accordance with the type of the input bytecode and the value of the counter cnt 440. If the input bytecode is an instruction to transfer the contents of the local variable area to the operand stack such as, e.g., an iload instruction, it is detected by the load detector unit 410 and a notification is sent as a load_vld signal to the register status control unit 50. If a load instruction to load a variable to the frame stack is detected by the load detector unit 410, a notification of the value of an index implicitly specified and the value of an index explicitly specified by the next byte is sent as a load_index signal to the register status control unit 50.

The buffer management unit 400 monitors whether a valid bytecode exists in the buffer java_inst 420 and asserts a bytecode fetch request signal java_fetch_req when there is no more valid bytecode, thereby requesting the instruction fetch unit 23 to fetch the next bytecode.

Next, the operation of the register status control unit 50 will be described. A description will be given first to the operation of the register status control unit 50 when the bytecode translator 40 is processing an ordinary input bytecode other than the load instruction to load a variable on the frame stack described above.

When the bytecode translator 40 is processing an ordinary input bytecode, an output signal load_vld from the load detector circuit 410 is brought into an OFF (negate) state. When the signal load_vld is in the negate state, the register status control unit 50 sends the register number on the top of the stack management register id_stack 540 to the bytecode translator 40 via the signal line src_reg_id1 or src_reg_id2.

In other words, the contents of the entry specified by the top pointer top_ptr 530 is selected from the stack management register id_stack 540 by the selector 541 and outputted as src_reg_id1.

If the input bytecode is using the higher-order two regions of the operand stack as operands, a decrementer 544 subtracts 1 from the value of the foregoing top_ptr 530 and the selector 542 selects the contents of an entry indicated by an output of the decrementer 544 from the id-stack 540 and outputs it as src_reg_id2.

If the native instruction generated by the bytecode translator 40 uses two source operands, the source register of the first operand is used as a destination register for the result of an arithmetic operation. In this case, the signal src_reg_id1 is used also as a signal for specifying the destination register. If one source operand is used in the native instruction, a usable register (entry) is searched in the general register 61 and used as the destination register. The searching of a usable register is performed under, e.g., the following conditions.

(a) Of the register contents management logics 500-1 to 500-N, a management logic in which the value of the valid indication memory reg_valid 501 is "0" and the value of the operand stack indication memory stack_vld 502 is "0" is selected. If one or more management logics satisfying the above condition are found, one of the management logics is selected by the priority encoder 520 and the number of the selected management logic is inputted as a usable register number to the selector 523. As a result, an unused entry which has not been mapped yet for the operand stack or for the local variable is selected from the general register 61 and designated as a new candidate for the destination register.

(b) From among the register contents management logics 500-1 to 500-N, a management logic in which the value of the valid indication memory reg_valid 501 is "1" and the value of the operand stack indication memory stack_vld 501 is "0" is selected. If one or more management logics satisfying the above condition are found, one of the management logics is selected by the priority encoder 521 and the number of the management logic is inputted as a usable register number to the selector 523. As a result, an entry being used for the local variable, but not for the operand stack, is selected from the general register 61 and designated as a new candidate for the destination register.

(c) From among the entry numbers of the general register 61 registered in the stack management register id_stack 540, the entry number indicated by the bottom pointer btm_ptr 531 is selected as a usable register number by the selector 543 and inputted to the selector 523. As a result, an entry located in the lowermost position of the operand stack is selected from among the general register entries that have already been mapped for the operand stack and designated as a new candidate for the destination register. If the destination register candidate is selected as the destination register by the selector 523, a spill-out process becomes necessary for the contents of the selected register so that a signal ovr-flw for causing the bytecode translator 40 to issue a store instruction for the spill-out is outputted from the pointer control circuit 523.

In the selector 523, descending priorities are assigned to the destination register candidates selected under the conditions (a), (b), and (c) in this order and the usable register number is selected. A notification of the register number selected by the selector 523 is sent as a dst_reg_id signal to the bytecode translator 40. In the case where a register designated under the condition (b) is selected as the destination register by the selector 523, however, it is necessary to change the set value of the valid indication memory reg_vld 501 of the register content management logic 500-k to "0". Since the changing of the set value of the memory reg_vld can be realized by using a simple and easy logic circuit, it is omitted in FIG. 3.

In the register status control unit 50, it is necessary to manage the operand stack 88 shown in FIG. 6 which is virtually defined in the JVM. Specifically, it is necessary to pop the register number of the general register entry used for the source operand from the stack management register id_stack 540 and to push the register number of the entry used for the destination operand to the stack management register id_stack 540.

Accordingly, the present embodiment generates a stack increment signal stack_inc from the translation engine 430 of the bytecode translator 40 in accordance with the result of decoding the input bytecode and causes the pointer control 532 of the register control unit 50 to update the value of the top pointer top_ptr 530 in response to the stack_inc. When a bytecode sequence which pops two source operands and pushes one destination in the operand stack is executed, stack_inc indicative of −1 is outputted from the translation engine 430 so that the pointer control 532 subtracts only 1 from the current value of the top pointer top_ptr 530. The register number for the destination outputted from the selector 523 is stored (pushed) by a store control circuit 533 into the entry specified by the top_ptr 530 in the stack management register id_stack 540.

When a new register number k is pushed into the stack management register id_stack 540, "1" is set by the store control circuit 533 to the operand stack indication memory stack_vld 502 of the register contents management logic 500-k corresponding to the register number k. For the register number popped from the stack management register id_stack 540, it is necessary to clear the value of the operand stack indication memory stack_vld 502 in the register content management logic 500-i corresponding to the register number i. The register number i has been outputted as the signal src_reg_id1 or src_reg_id2 from the selector 541 or 542 for reading out the stack management register id_stack 540. Accordingly, a clear control signal for the stack_vld can be generated by using a relatively simple logic circuit (not shown) which decodes the output signals from the selectors 541 and 542.

Next, the operation of the Java accelerator during the conversion of the bytecode including the load instruction to load a variable to the operand stack, which characterizes the present invention, will be described.

A description will be given first to the operation during a first conversion process for the load instruction in the iteration loop, i.e., when the local variable read out according to the load instruction has not been mapped yet to the general register 61.

The variable load instruction stored in the buffer java_inst 420 is decoded by the load detector unit 410 so that the signal load_vld is asserted and the index of the local variable to be treated in the load instruction is outputted as load_index via the gate 411. When the signal load_vld is brought into the ON state, the register status control unit 50 searches based on the index notified as load_index, whether the local variable to be loaded on the operand stack has already been mapped to the general register 61.

Specifically, in each of the register contents management logics 500-1 to 500-N, the contents of the index memory reg_idx 503 is compared with the notified index load_index by a comparator circuit.504 and a judgment signal outputted from the AND circuit 505 of each of the management logics is inputted to an OR circuit 510, whereby a detection signal reg_hit indicative of whether the notified index load_index has already been registered in any of the entries in the general register 61 is obtained. This logic is similar to a hit detection logic in an ordinary cache memory. During the first conversion process for the bytecode including the variable load instruction, the notified index load_index is in a state unregistered in the general register so that the detection signal reg_hit is not asserted.

In this case, it is necessary to issue a variable load instruction after the conversion from the bytecode translator 40 and to specify the destination register for the local variable from the register status control unit 50. When the detection signal reg_hit is in the OFF state, the selector 523 selects a destination register from among the candidates designated under the conditions (a), (b), and (c) described above and outputs the register number as dst_reg_id.

When the variable load instruction to load a variable on the operand stack is issued and the local variable is determined to be mapped to the entry in the general register 61 indicated by the dst_reg_id, it is necessary to store the relationship between the variable and the register number to prepare for the next processing of the variable load instruction. Accordingly, the present embodiment registers the index value load_ index used by the variable load instruction to the index memory reg_idx 503 and sets "1" to the validity indication memory reg_vld 501 in the register contents management logic 500-k corresponding to the destination register number k for the variable. This operation is performed by a reg_idx store control 512. When the detection signal reg_hit is brought into the OFF state, the reg_idx store control 512 decodes the register number dst_reg_id outputted from the selector 523 and supplies a write enable signal to the memories reg_valid 501 and reg_idx 503 of the register contents management logic 500-k corresponding to the register number, thereby updating the contents of each of the validity indication memory reg_valid 501 and the operand stack indication memory reg_idx 503.

In the case of a bytecode sequence shown in FIG. 4(C), local variables "i", "sum" and "array pointer" specified by the respective iload instructions (2), (4) and (6) and a reference type variable "array pointer" specified by the aload instruction (5) are stored through the above operation in the register contents management logic corresponding to the register number dst_reg_id selected by the selector 523, respectively.

Next, the operation of the Java accelerator during the second and subsequent conversion processes for the bytecode including the variable load instruction in the iteration loop will be described.

When the signal load_vld outputted from the bytecode translator 40 is asserted and the index value of the variable load instruction is sent as the load_index for notification, the contents of the index memory reg_idx 503 and the notified index load_index match in any of the register contents management logics 500-k so that the output of the AND circuit 505 is brought into the ON state. At this time, the detection signal reg_hit outputted from the OR circuit 510 is asserted. In addition, a register number "k" corresponding to the register contents management logic 500-k is outputted from the encoder 511 connected to the AND circuit 505.

If the index value of the variable load instruction has already been stored in the general register, there is no need to execute the variable load instruction in the ALU 60. Accordingly, it is unnecessary to supply a native instruction generated in the bytecode translator 40 to the instruction decoder 22. In this case, the operation to be performed in the Java accelerator 30 is the stacking of the local variable already mapped to the general register 61 on the operand stack, i.e., the pushing of the register number k for the local variable to the stack management register id_stack 504 in the register status control unit 50.

The detection signal reg_hit outputted from the OR circuit 510 has been inputted as a conversion inhibit signal for the variable load instruction to the translation engine 430 of the bytecode translator 40. When the detection signal reg_hit is brought into an asserted state, the translation engine 430 discards the bytecode currently under conversion and starts a conversion process for the next bytecode fetched from the buffer java_inst 420.

When the detection signal reg_hit is brought into the asserted state, the selector 523 selects the register number outputted from the encoder 511. As a result, the number of the register holding the local variable is stored in the entry specified by the top pointer top_ptr 530 in the stack management register id_stack 540 and "1" is set to the memory stack_vld 502 of the register contents management logic 500-k corresponding to the register number. This operation is the same as during the conversion process for an ordinary bytecode described above.

When the processing for one frame is completed and the local variables of another frame in the frame stack 86 are processed, the correspondence between the index values and actual local variables changes with the switching of the frames. In this case, it is necessary to entirely clear the set values in the validity indication memory reg_valid 501 of each of the register contents management logics 500-1 to 500-N. This operation is controlled by a control circuit (not shown) which detects the changing of the frame pointer fp, i.e., the writing of data to a specified area in the general register 61 allocated for the frame pointer fp and issues a clear signal to each of the valid indication memories reg_valid 501.

Figure 5:
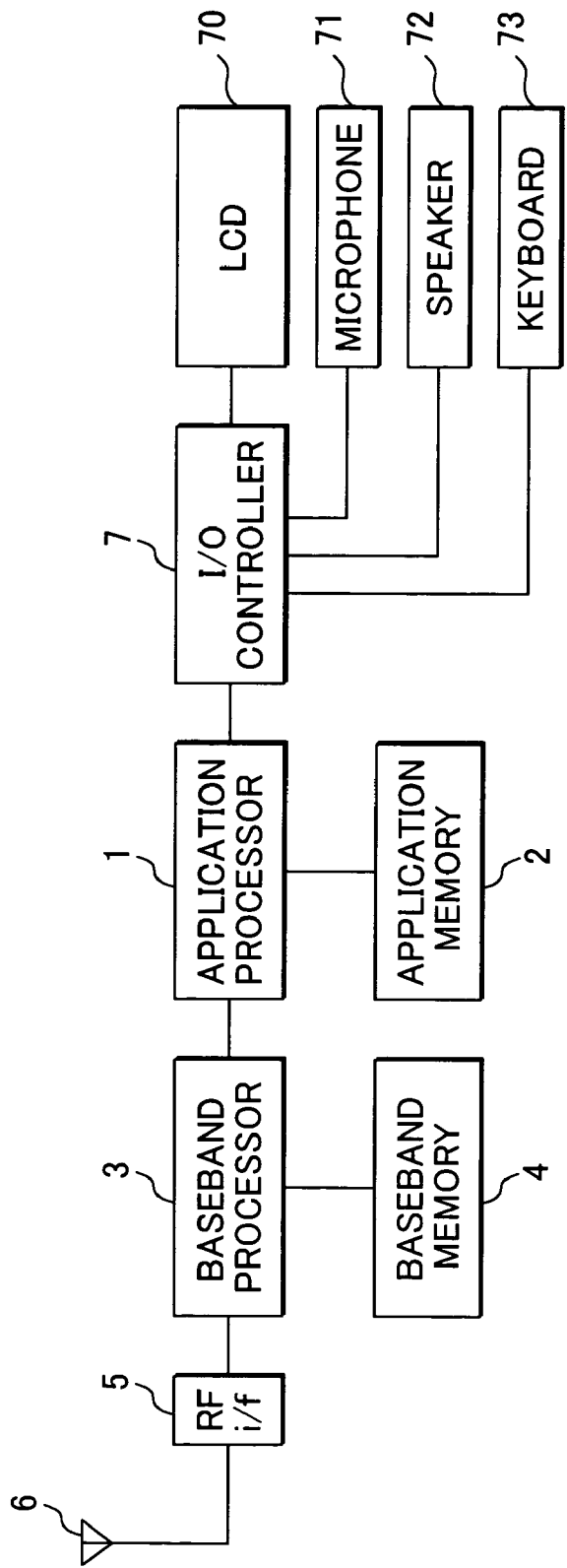
FIG. 5 is a system structural view showing an example of the embedded use of a processor according to the present invention.

FIG. 5 shows a block structural view of a mobile phone system as an example of an embedded system using the processor according to the present invention.

A processor provided with the Java accelerator according to the present invention is used as an application processor 1. A Java program is preliminarily registered in the application memory 2 connected to the processor 1. However, a part of the Java program may also be downloaded to the memory 2 via a network. In this case, the Java program received by an antenna 6 is inputted to a baseband processor 3 and a baseband memory 4 via an RF interface 5, subjected to format conversion, and then stored in the application memory 2 via the processor 1. The Java program is executed in response to an input from a microphone 71 or a keyboard 73 and the result of the execution is outputted to an LCD 70 or to a speaker 72 via an I/O controller 7. The above system configuration allows the provision of a mobile terminal system capable of high-speed execution of a Java application program preliminarily embedded in the memory or a Java application program delivered via the Internet.

INDUSTRIAL APPLICABILITY

As has been understood from the foregoing description, according to the processor system of the present invention, the Java accelerator is composed of the bytecode translator and the register status control unit and the use status of each of the register areas of the general register is managed by the register status control unit. This configuration allows dynamic mapping of the Java operand stack to any of the register areas of the general register.

In accordance with the processor system of the present invention, the supply of a native instruction from the bytecode translator to the instruction decoder is inhibited upon the detection of a redundant bytecode in the register status control unit. This allows the avoidance of the execution of an extra instruction by the processor and allows a Java program to be executed at a higher speed.

In a Java program, instructions for loading local variables on the operand stack generally account for about 30% of all the bytecodes. In accordance with the present invention, since a local variable load instruction in an iteration loop is treated as a redundant bytecode to omit the execution thereof, it is able to offer 20-30 percent greater performance in the execution speed than prior art technologies depending on the contents of a Java program.

The invention claimed is:

1. A processor system comprising:
a processor having an instruction decoder, a general register composed of a plurality of register areas, and at least one arithmetic and logic unit (ALU) and executing a native instruction sequence; and
an accelerator for converting a bytecode sequence written in Java-type of programming language to the native instruction sequence for said processor and supplying the native instruction sequence to said instruction decoder, wherein
said accelerator includes a bytecode translator for converting the bytecode sequence to the native instruction sequence for said processor and a register status control unit for mapping an operand stack related to the bytecode sequence to any of the register areas of said general register in accordance with the bytecode being converted in said bytecode translator, while a bytecode indicative of an instruction to load a variable on the operand stack is converted in said bytecode translator, the register status control unit judges whether or not the operand stack has been already mapped to one of the register areas, and when the register status control unit judges the operand stack has been already mapped to said one of the register areas the native instruction converted from the bytecode indicative of the instruction to load the variable on the operand stack is not supplied to the instruction decoder.

2. The processor system according to claim 1, wherein said register status control unit has register contents management means for storing a correspondence between each of the register areas of said general register and a variable being set to the register area, thereby to judge, when a bytecode indicative of the instruction to load a variable on the operand stack is processed in said bytecode translator, whether or not the operand stack has been already mapped to one of the register areas by comparing the variable treated in said variable load instruction with the variable stored in said register contents management means.

3. The processor system according to claim 2, wherein said register contents management means stores status information indicative of a use status of each of the register areas of said general register and said register status control unit performs mapping of the operand stack to said general register based on the status information.

4. The processor system according to claim 1, wherein said register status control unit has register contents management means for storing a correspondence between each of the register areas of said general register and an index value of the local variable being set to the register area, thereby to judge, when a bytecode indicative of the instruction to load a local variable on the operand stack is processed in said bytecode translator, whether or not the operand stack has been already mapped to one of the register areas by comparing an index value of the local variable treated in said load instruction with the index value stored in said register contents management means.

5. The processor system according to claim 4, wherein said register contents management means stores status information indicative of a use status of each of the register areas of said general register and said register status control unit performs mapping of the operand stack to said general register based on the status information.

6. A processor system comprising of:
a processor having an instruction decoder, a general register composed of a plurality of register areas, and at least one arithmetic and logic unit (ALU);
a cache memory for storing a bytecode sequence read out from a main memory or a native instruction sequence for said processor read out from the main memory;
an accelerator for converting the bytecode sequence written in Java-type of programming language to a native instruction sequence for said processor; and
a selector for selectively supplying to said instruction decoder, the native instruction sequence for said processor which has been read out from said cache memory or the native instruction sequence for said processor which has been outputted from said accelerator, wherein
said accelerator includes a bytecode translator for converting the bytecode sequence to the native instruction sequence for said processor and a register status control unit for mapping an operand stack related to the bytecode sequence to any of the register areas of said general register in accordance with the bytecode being converted in said bytecode translator, while a bytecode indicative of an instruction to load a variable on the operand stack is converted in said bytecode translator, the register status control unit judges whether or not the operand stack has been already mapped to one of the register areas, and when the register status control unit judges the operand stack has been already, mapped to said one of the register areas, the native instruction converted from the bytecode indicative of the instruction to load the variable on the operand stack is not supplied to the instruction decoder.

7. The processor system according to claim 6, wherein
said bytecode translator is provided with means for generating a first signal by detecting a bytecode including the instruction to load a local variable on the operand stack, and
said register status control unit judges whether or not the operand stack has been already mapped to one of the register areas in response to the first signal and issues, when the register status control unit judges the operand stack has been already mapped to the one of the register areas an output inhibit signal of the native instruction to said bytecode translator.

8. The processor system according to claim 7, wherein said bytecode translator is provided with means for generating a second signal for specifying the local variable treated in said load instruction and said register status control unit has register contents management means for storing a correspondence between each of the register areas of said general register and a variable being set to the register area, thereby to judge, when said first signal is outputted from said bytecode translator, whether or not the operand stack has been already mapped to one of the register areas by comparing the local variable indicated by said second signal with the variable stored in said register contents management means.

9. The processor system according to claim 8, wherein said register contents management means stores status information indicative of a use status of each of the register areas of said general register, and said register status control unit performs mapping of the operand stack to said general register based on said status information.

10. The processor system according to claim 7, wherein said bytecode translator is provided with means for generating a second signal indicative of an index value of the local variable treated in said load instruction and said register status control unit has register contents management means for storing a correspondence between each of the register areas of said general register and an index value of the local variable being set to the register area, thereby to judge, when said first signal is outputted from said bytecode translator, whether or not the operand stack has been already mapped to one of the register areas not by comparing the index value indicated by said second signal with the index value stored in said register contents management means.

11. The processor system according to claim 10, wherein said register contents management means stores status information indicative of a use status of each of the register areas of said general register, and said register status control unit performs mapping of the operand stack to said general register based on said status information.

* * * * *